United States Patent [19]
Bluntzer

[11] 3,826,385
[45] July 30, 1974

[54] SILO FILLING ARRANGEMENT

[75] Inventor: René Bluntzer, Thann, France

[73] Assignee: Ameco S.A., Kingerskeim, France

[22] Filed: May 6, 1971

[21] Appl. No.: 140,775

[30] Foreign Application Priority Data
May 6, 1970   France .............................. 70.16467

[52] U.S. Cl. .......... 214/17 CA, 193/29, 214/17 CB, 214/17 DA
[51] Int. Cl. ............................................ B65g 65/32
[58] Field of Search...... 214/17 C, 17 CB, 17 CA; 10 193/23, 29; 198/36, 169, 205

[56] References Cited
UNITED STATES PATENTS
402,284   4/1889   Stuebner ........................ 214/17 CB
3,145,855   8/1964   Plugge et al. .................. 214/17 CB FOREIGN PATENTS OR APPLICATIONS
956,182   7/1949   France ........................... 214/17 DA Primary Examiner—Robert G. Sheridan
Attorney, Agent, or Firm—Robert E. Burns; Emmanuel J. Lobato; Bruce L. Adams

[57] ABSTRACT

This invention relates to a device for discharging loose materials or bulk products, notably for a rotary scraper, which comprises a conveyor duct to which a movement of rotation identical with that of said scraper is imparted, and of which at least one section comprises movable discharge means adapted to move along said section in the axial direction thereof. With this arrangement the head or height of fall of the materials to be discharged is reduced considerably so that the detrimental emission of dust is safely avoided. Furthermore, this device facilitates the storage by successive layers of the materials in view of its subsequent homogenization (FIG. 1).

13 Claims, 2 Drawing Figures

SILO FILLING ARRANGEMENT

BACKGROUND OF THE INVENTION

This invention relates to the discharge of loose materials or bulk products, notably for rotary scrapers.

In material handling apparatus notably of the type designed for the storage and/or picking up of loose materials or bulk products, rotary scrapers are frequently used. The products to be stored are poured into the upper portion of the apparatus and distributed by means of a kind of tuyere over one-half of the storage pile area, the apparatus picking up on the other hand the previously stored materials from the other half of said area. Thus, the products are caused to fall from a certain height and this fall is attended by the release of considerable dust. More particularly, in the case of cement plants the quantity of dust thus released is such that the various material handling means enclosed in the silo or like storage area are only of the remote-control type. Therefore, it is hardly possible to control with precision the piles of stored products.

SUMMARY OF THE INVENTION

It is the essential object of the present invention to avoid the inconveniences broadly set forth hereinabove by providing a discharge device capable of conveying loose products or bulk materials, to a location in close proximity of the pile of stored products and siloeing the various products or materials by forming successive layers thereof and thus permit their homogeneization.

To this end, the present invention is concerned with a device for discharging loose products or bulk materials, notably for rotary scrapers, which is characterized in that it comprises a conveyor duct to which a movement of rotation identical with the movement of rotation performed by the scraper is impressed, at least one of the sections of said duct comprising movable discharge means adapted to be moved along said duct.

BRIEF DESCRIPTION OF THE DRAWINGS

In order to afford a clearer understanding of this invention, reference will now be made to the accompanying drawings illustrating diagrammatically by way of example a typical form of embodiment thereof. In the drawings.

DESCRIPTION OF THE PREFERRED EMBODIMENT

Figure 1:
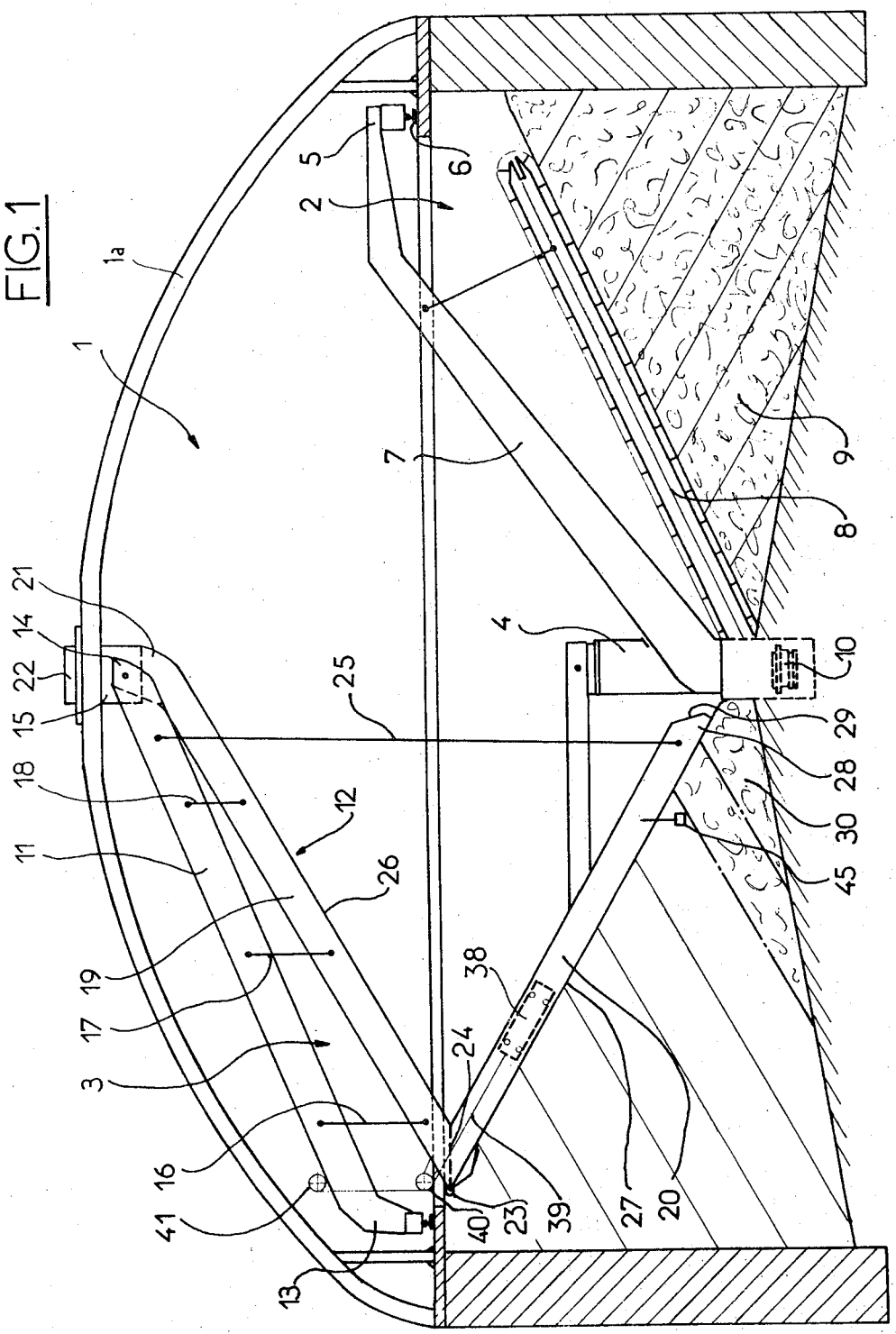
FIG. 1 is a diagrammatic vertical sectional view showing a storage silo comprising a rotary scraper and a discharge device according to this invention, and, FIG. 2 is a diagrammatic vertical sectional view showing on a larger scale the lowermost section of the duct for conveying the loose or bulk products and its discharge means.

Referring to FIG. 1, the pile storage silo 1 comprises a rotary scraper 2 and a discharge device 3. These means 2, 3 are adapted to pivot about a vertical central pintle 4 supported by the lower portion of the silo. The upper portion 5 of scraper 2 is supported by a circular rail or track 6. This rotary scraper 2 comprises a frame structure 7 supporting an inclined scraper arm 8 extending radially from the center to the outer periphery and upwards; this arm 8 is adapted to scrape or skim the top layer of a storage pile or bulk products 9 contained in the silo 1 in order to direct these products towards a central pick-up device 10.

The discharge device 3 comprises a boom 11 and a discharge duct 12 suspended from said boom as shown. The boom 11 bears with its lower portion 13 on the circular rail or track 6. The upper end of the boom 11 is rigid with a vertical pivot member 15 mounted centrally of the dome-shaped frame structure 1a of silo 1. Suspension members 16, 17 and 18 such as chains or links interconnect the discharge duct 12 and boom 11. The duct 12 comprises two longitudinal sections, i.e., an upper section 19 and a lower section 20. These sections 19, 20, have a certain angular relationship, namely they form an acute angle to the horizontal, sufficient for causing the natural gravity flow of the products conveyed to the upper end 21 of the first section 19 through any suitable feed member 22. This feed member 22 is disposed above the central pivot member 15 so that the products can be transferred irrespective of the position of boom 11 and conveyor duct 12. To this end, the upper end 21 of section 19 is rigid with said vertical pivot member 15.

As illustrated in FIG. 1, the angle formed by duct sections 19 and 20 is constant but means may also be provided, if desired, for modifying this angle. To this end, a horizontal pivot pin 23 is provided at the junction 24 of the two duct sections 19 and 20, together with means (shown diagrammatically at 25) for raising or lowering the lower section 20.

Figure 2:
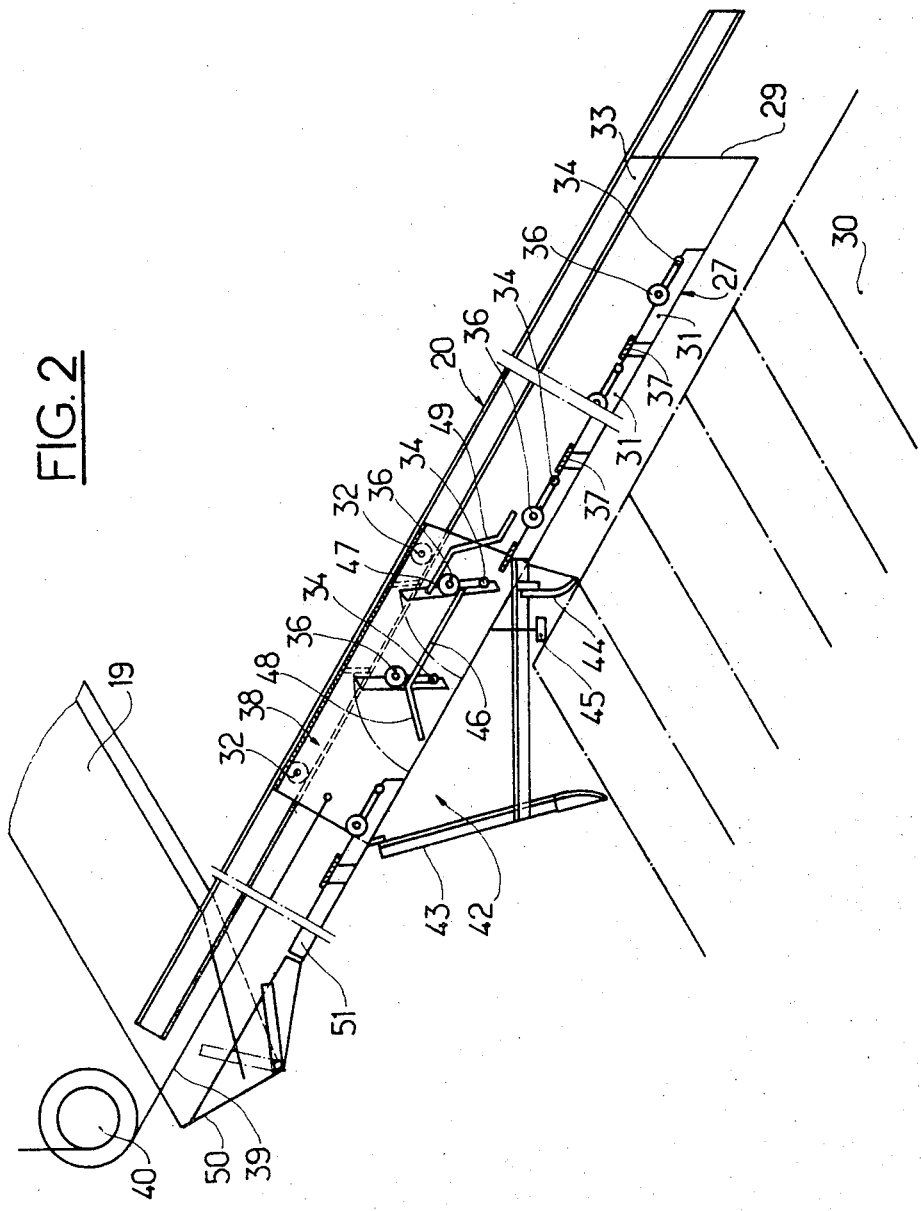

The products poured into the feed member 22 penetrate into the upper portion 21 of duct section 19 and flow along the bottom or lower wall 27 of the lower section 20. At its lower end, this section 20 comprises an opening 29 through which, at the beginning of the storage process, the products are caused to flow. When a first heap 30 has thus been formed, the discharge means illustrated in detail in FIG. 2 are operated.

The lower wall or bottom 27 of duct section 20 comprises a plurality of adjacent flap doors 31 each adapted to pivot about a pair of aligned transverse hinge pins 34 rigid with the lateral walls of duct section 20. Each flap door 31 carries a roller 36 and these flap doors 31 are normally kept in mutual coplanar relationship by engaging spaced transverse abutment members 37 extending between the lateral walls of the lower duct section 20. Furthermore, a truck or trolley 38 is adapted to travel inside the lower section 20 of duct 12; this truck 38 is adapted to roll longitudinally therein by means of rollers 32 engaging a pair of upper U-sectioned guide rails 33. The truck 38 is connected by a cable 39 and a pulley 40 to a traction device 41, for example a winch. This truck 38 comprises a lower discharge hopper 42 provided with a pair of directional members 43, 44 for limiting the thickness of the layer of bulk material or product. A feeler 45 rigid with truck 38 and somewhat spaced from the bottom of this truck is adapted to detect the height of the storage pile in order to control the truck 38 with a view to perform the next storage step at the end of the formation of an elementary pile of products.

The truck 38 comprises a front ramp 46 and a rear ramp 47. The front ramp 46 comprises at its front end an inclined plane 48 which, during the upward movement of truck 38, is adapted to raise each flap door 31 by means of its roller 36, so that at the end of this movement said roller 36 engages the ramp 46. The length of this ramp 46 is so calculated that the successive rollers 36 carried by two adjacent flap doors 31 engage said ramp 46. Thus, two successive flap doors 31 are open simultaneously and all the products fall through the corresponding aperture.

The front portion of the rear ramp 47 partially overlaps the rear portion of the front ramp 46. The roller 36 of the open rear flap door 31, i.e., the lowermost of the two, is thus located between the two ramps 46 and 47. During the next forward movement of truck 38 and upon completion of the storage layer an inclined plane 49 of rear ramp 47 pushes this roller 36 downwards and thus the corresponding flap door 31 is reclosed.

Thus, the bulk products can be stored by forming successive layers thereof. The lower end 50 of the upper section 19 of duct 12 comprises another movable flap door 51 whereby the flow of products can be directed at the end of the storage area.

Suitable control means, such as limit switches or the like, may be provided for detecting the actual positions of flap doors 31, 32.

What I claim is:

1. Device for discharging bulk material into a storage silo having a scraper rotatable about a central axis, which comprises a bulk material discharge duct mounted in said silo for rotation about said axis, said duct comprising an inclined upper duct section having an upper material-receiving end located centrally of said silo and a lower discharge end located peripherally of said silo, and an inclined lower duct section having an upper end positioned to receive material from the lower end of said upper duct section and a lower end located near the center of said silo, means interconnecting the upper end of said lower duct section with the lower end of said upper duct section for relative angular movement to vary the angle between said duct sections, means for supporting the lower end of said lower duct section at a selected height and thereby selecting the angular relation of said duct sections to one another, discharge means movably mounted in said lower duct section for discharging said bulk material from said lower duct section and means for moving said discharge means along said lower duct section to different positions to select the position at which said bulk material is discharged from said lower duct section.

2. Device according to claim 1, wherein said lower duct section comprises opposite side walls and a bottom comprising a series of flap doors hingedly carried by said side walls, said discharging means comprising means for opening at least one of said flap doors at the position to which said discharge means is selectively moved.

3. Device according to claim 2, further comprising a movable flap door for discharging said bulk material directly from said upper duct section into said silo.

4. Device according to claim 2, comprising means at the lower end of said lower duct section for discharging said bulk material directly from said lower end of said lower duct section into said silo.

5. Device according to claim 2, wherein rollers are provided on said flap doors and wherein said discharge means comprises a carriage having track means engaging said rollers to open said flap doors as said carriage, is moved along said lower duct section.

6. Device according to claim 5, wherein said track means comprises an upwardly inclined ramp engageable with said rollers to open said flap doors and a downwardly inclined ramp engageable with said rollers to close said flap doors.

7. Device according to claim 1, wherein said discharge means comprises a discharge hopper and directional members associated with said hopper for limiting the thickness of a layer of said bulk material discharged by the device.

8. Device according to claim 7, further comprising feeler means for detecting the level of the previously discharged layer of said bulk material.

9. Device for discharging bulk material into a storage silo having a scraper rotatable about a central axis, which comprises a bulk material discharge duct mounted in said silo for rotation about said axis, said duct comprises an inclined duct section extending radially of said silo, means for supplying said bulk material to the upper end of said inclined duct section, discharge means movably mounted in said inclined duct section for discharging said bulk material from said inclined duct section, and means for moving said discharge means along said inclined duct section to different positions to thereby select the position at which said bulk material is discharged from said inclined duct section, said inclined duct section comprising opposite side walls and a bottom comprising a series of flap doors hingedly converted to said side walls and having rollers spaced from the hinged connection of said flap doors to said side walls, and said discharge means comprises a carriage movable along said inclined duct section and having track means engageable with said rollers to swing said flap doors to open position as said carriage is moved along said inclined duct section.

10. Device according to claim 9, wherein said track means comprises an upwardly inclined ramp engageable with said rollers to open said flap doors and a downwardly inclined ramp engageable with said rollers to close said flap doors.

11. Device according to claim 9 wherein said discharge means further comprises a discharge hopper carried by said carriage and positioned below said duct section to guide and direct bulk material discharged from said duct section through said trap doors when in open position.

12. Device according to claim 9 comprising feeler means carried by said carriage for detecting the level of previously discharged bulk material in said silo.

13. Device according to claim 9, wherein said duct section has tracks provided on opposite side walls and said carriage has rollers running on said tracks to support and guide said carriage in its movement along said duct section.

* * * * *